June 15, 1943.   A. S. FOSTER   2,321,667
SERVICE STOPPER FOR GAS MAINS, BRANCH
PIPE CONNECTIONS, AND THE LIKE
Filed June 2, 1942

INVENTOR
ARTHUR SYDNEY FOSTER
By
*Samuel Scrivener*
ATTORNEY

Patented June 15, 1943

2,321,667

UNITED STATES PATENT OFFICE 2,321,667

SERVICE STOPPER FOR GAS MAINS, BRANCH PIPE CONNECTIONS, AND THE LIKE

Arthur Sydney Foster, Stourport on Severn, England, assignor to Underpressure Engineering Company Limited, Mansfield, England, a company of England Application June 2, 1942, Serial No. 445,488
In Great Britain May 28, 1941

2 Claims. (Cl. 138—89)

It is well known in the gas industry to employ rubber plugs or discs for closing the end of the last pipe of a main when other pipes are being laid and connected up in the process of laying, or repairing, the main. In some cases the stopper is provided with a rod and eye so that a newly laid pipe may be joined up to the remainder of the main whilst the stopper is still in the last laid pipe of the main, and the stopper may then be engaged by a hook inserted up the new pipe, and drawn out of its position and into the new pipe to stop that in its turn, whilst another pipe is laid and connected. In this way mains may be added to, or repaired without a serious loss of gas, and without a serious disturbance of the supply along them.

An object of the invention is to provide such a stopper or taper plug having a cavity entering one end so that the walls of said cavity are yielding and can accommodate inequalities in the internal surface of the pipe into which the stopper is inserted, and so that a tool may be inserted in it for manipulating the stopper.

It is also an object of the invention to provide the stopper or plug with a radial collar or flange at the end wherein the cavity opening is arranged, the collar terminating in a thickened lip or bead.

It is a further object of the invention to provide a tapered stopper having a moulded cavity entering from the large end and terminating short of the other end, with a radial collar around the large end, and with a cap or sleeve projecting from the collar in such a manner that it surrounds the plug part of the stopper from which it is spaced to an extent corresponding approximately to the wall thickness of the pipe for which the stopper is designed.

The appended drawing serves to illustrate the invention.

Figure 1:
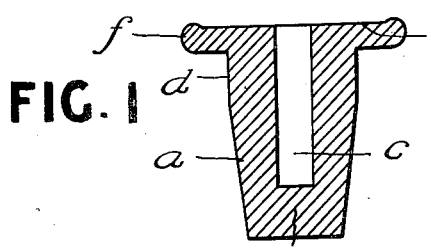
Figure 1 is a section of one construction of service stopper in accordance with the invention.
Figure 2:
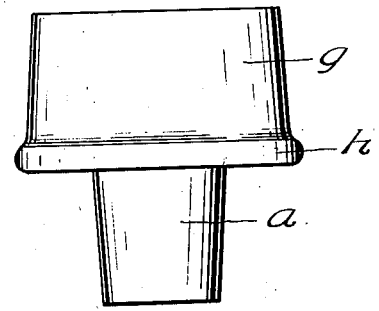
Figure 2 is an elevation of the preferred construction of service stopper in accordance with the invention.
Figure 3:
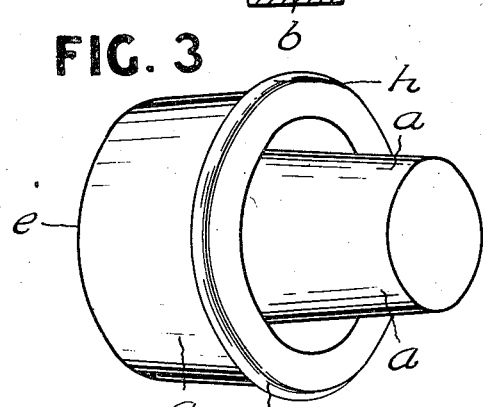
Figure 3 is a perspective view of this preferred construction.
Figure 4:
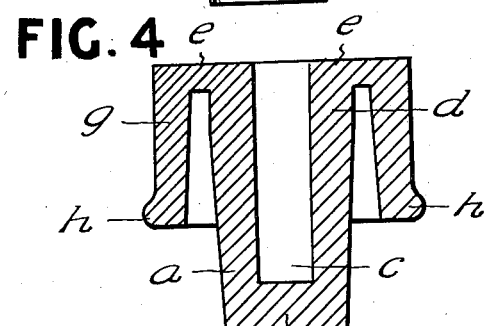
Figure 4 is an axial section thereof.

The simple construction shown at Figure 1 consists of a tapered rubber plug $a$ with a blind end $b$ and a bore or opening $c$ to render the walls more readily elastic to accommodate and seal against the inequalities of surface in the end of a metal pipe. The bore or opening $c$ also enables a tool or handle to be inserted in the plug to facilitate its insertion in a pipe end and removal therefrom. The upper part $d$ of the plug $a$ is practically parallel sided whereas the lower portion has its sides tapering toward the blind end $b$. The radial flange $e$ may if provided have a peripheral thickening or bead $f$.

In Figures 2 to 6 the service stopper follows on similar lines to Figure 1, but is provided with a radial end flange $e$ and a resilient cap or sleeve $g$ of substantial length and thickness is moulded in one with it but coaxial with the plug $a$ and spaced from it such a distance that the interior surface will pass over the outside of the pipe end in which the plug part $a$ is inserted. At the free end of this cap or sleeve is a thickened part or bead $h$. The interior of the elastic cap or sleeve is left smooth, and when the stopper is inserted in the end of a pipe, the yielding walls bordering its cavity make an effective closure for the internal bore of the pipe and the cap encloses and establishes effective closing contact with the external surface near the end of the pipe.

For a one inch pipe, i. e. having an internal diameter of 1″, the plug part $a$ of the stopper may for example be 2¼″ in length overall with say ⅛″ taper in the first inch towards the leading end of the plug, the part $d$ being parallel sided or only very slightly tapered. The cap or sleeve $g$ may conveniently be made 1¼″ in length and ³⁄₁₆″ thickness and its distance from the root of the plug would be ¼″.

Figure 5:
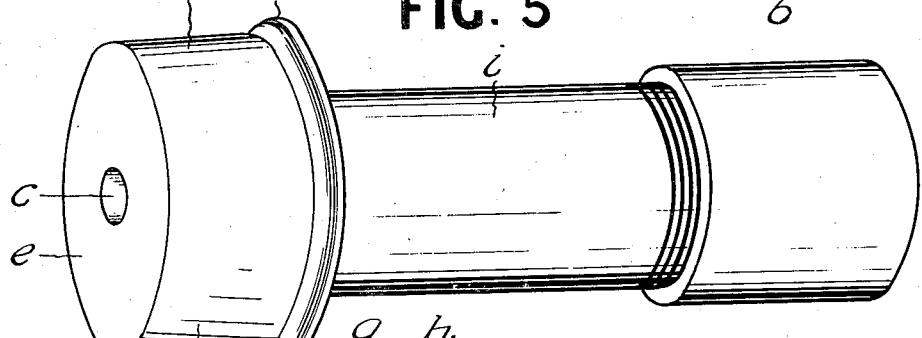
Figure 5 is a perspective view of the stopper in use at the end of a gas pipe.
Figure 6:
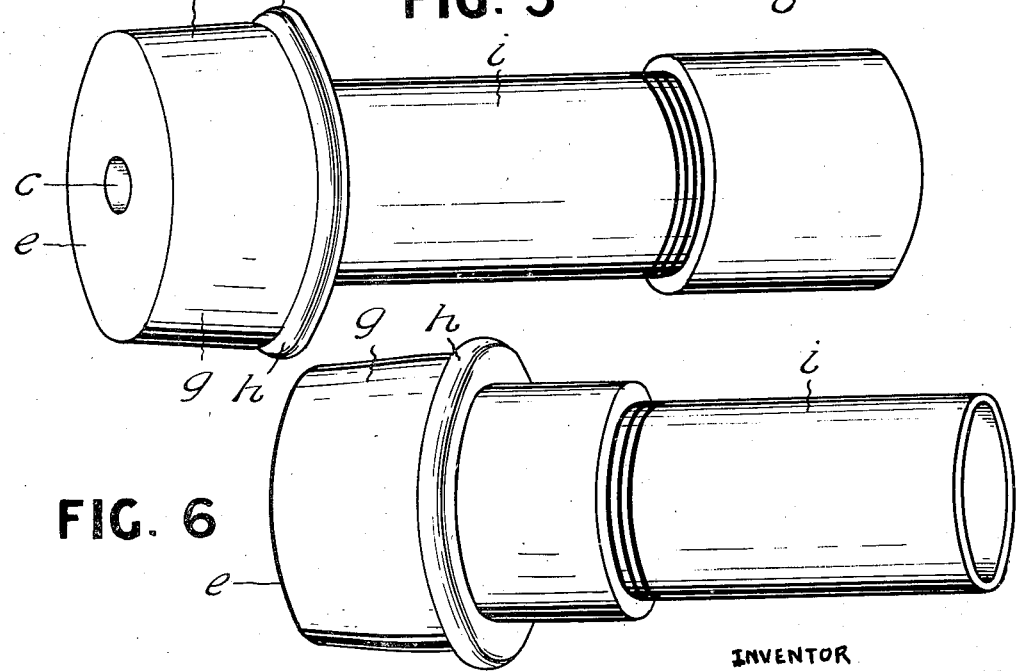
Figure 6 is a perspective view of the stopper in use on a pipe socket.

Examples of the manner of use of the stopper or a pipe $i$ are seen in Figures 5 and 6.

The plug may be inserted in the end of a pipe and the flange will close against the pipe end with the cap or sleeve around the outside of the pipe. Alternatively the preferred device is useful for closing the end of a socket part where it projects from a pipe end which is screwed into it. In this use the cap of the stopper will tightly clasp and make a fluid-tight closure with the socket end when it is drawn on to it. This is effective even where the pipe end is so far from the open end of the socket that the plug part $a$ cannot effectively enter it.

The fitting thus serves two purposes: It will close a gas service pipe by being simply pushed into place to plug the pipe, and it will close a socket by capping the end thereof.

I claim:

1. Service stopper for gas mains, branch pipe connections and the like comprising a generally cylindrical resilient plug part adapted to be inserted in the bore of a pipe and having an axial cavity therein opening at the following end of the plug part and terminating short of the leading end thereof and being of such length and diameter that the surrounding walls of the plug part are forced thereinto when the plug part is inserted in the bore of a pipe, said plug part having an outer surface which is cylindrical adjacent the following end of the stopper and which tapers from said cylindrical surface to the leading end of the plug part, and a radially extending collar connected to and surrounding said plug part at the following end thereof.

2. Service stopper for gas mains, branch pipe connections and the like comprising a generally cylindrical plug part adapted to be inserted in the bore of a pipe and having an axial cavity therein opening at the following end of the plug part and terminating short of the leading end thereof and being of such length and diameter that the surrounding walls of the plug part are forced thereinto when the plug part is inserted in the bore of a pipe, said plug part having an outer surface which is cylindrical adjacent the following end of the stopper and which tapers from said cylindrical surface to the leading end of the plug part, a radially extending collar connected to and surrounding said plug part at the following end thereof, a hollow cylindrical cap depending from said collar and arranged coaxially of said plug part, said cap being spaced from the outer surface of the plug part and terminating short of the leading end of the plug part, and a thickened bead formed at the free extremity of the cap.

ARTHUR SYDNEY FOSTER.